(12) United States Patent
Kamijima

(10) Patent No.: US 7,988,307 B2
(45) Date of Patent: Aug. 2, 2011

(54) IMAGE DISPLAY DEVICE

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 502 days.

(21) Appl. No.: 12/169,802

(22) Filed: Jul. 9, 2008

(65) Prior Publication Data

US 2009/0040474 A1    Feb. 12, 2009

(30) Foreign Application Priority Data

Aug. 6, 2007 (JP) ................. 2007-204166

(51) Int. Cl.
*G03B 21/20* (2006.01)

(52) U.S. Cl. .................... 353/122; 359/446

(58) Field of Classification Search .......... 353/85, 353/122; 359/446, 450–454
See application file for complete search history.

(56) References Cited

U.S. PATENT DOCUMENTS 7,697,201 B2 * 4/2010 Seki et al. ............ 359/446
2008/0151196 A1 * 6/2008 Kinoshita ............ 353/69

FOREIGN PATENT DOCUMENTS

JP  2005-338520  12/2005
JP  2006-221069   8/2006

* cited by examiner

*Primary Examiner* — Seung C Sohn
(74) *Attorney, Agent, or Firm* — AdvantEdge Law Group, LLC

(57) ABSTRACT

An image display device includes a lighting section including a light source, a light modulation section that modulates light emitted from the lighting section in accordance with an image signal to form an image, and a scintillation reduction section that reduces the scintillation caused by the light emitted from the lighting section, and the scintillation reduction section reduces the scintillation so that a plurality of areas having different extents of reduction of the scintillation from each other is formed in the image.

3 Claims, 9 Drawing Sheets

IMAGE DISPLAY DEVICE

BACKGROUND

1. Technical Field

The present invention relates to an image display device, and is particularly suitable for an image display device using light (coherent light) with high coherency.

2. Related Art

In recent years, rapid popularization of projectors has been presented. The most significant advantage of the projection type image display device is to provide a product with an equivalent screen size at a lower price compared to a direct-view type display such as a liquid crystal television or a plasma display. However, price-reduction has recently been in progress also in the direct-view type products, and further improved performance in image quality is required for the projection type image display devices. In a projector, a light modulation element such as a liquid crystal light valve is irradiated by the light emitted from a light source, and the projection light modulated by the light modulation element is enlargedly projected on a screen, thereby displaying an image. On this occasion, not only that the image is displayed on the screen, but also that the observer is to watch the dazzle on the entire screen. The dazzle is caused by the brightness variation associated with the interference of the light beams, and is called scintillation, speckle noise, or the like.

Here, the principle of generation of the scintillation will briefly be explained.

As shown in FIGS. 14A and 14B, the light emitted from a light source 70 is transmitted through a liquid crystal light valve (not shown) and then projected on a screen 74. The projection light projected on the screen 74 is diffracted by a number of scattering members 72 included in the screen 74, and is diffused by the scattering members 72 behaving like a secondary wave source. As shown in FIG. 14B, the two spherical waves caused by the secondary wave source causing reinforcement and deadening of the light in accordance with the mutual phase relationship, thus bright and dark fringes (interference pattern) appear between the screen 74 and the observer. When the eyes of the observer come into focus on the image field S generated by the interference pattern, the observer recognizes the interference pattern as the scintillation. The scintillation gives uncomfortable feeling to the observer trying to watch the image formed on the surface of the screen as if a curtain is stretched in front of the screen.

Incidentally, in the recent projectors, development of a new light source replacing the conventional high-pressure mercury lamp has been in progress, and in particular, the expectation for the laser source as a next-generation light source for projectors has been raised from viewpoints of energy efficiency, color reproducibility, long life, quick lighting, and so on. However, the projection light on the screen by the laser source becomes the light (coherent light) with very high coherency because the phases of the light beams in the adjacent areas are aligned with each other. Since the coherent length of the laser beam extends to several tens meters in some cases, if the light beam from a single light source is divided and then recombined, the light beam combined through the light paths having a shorter difference than the coherent length causes strong interference. Therefore, there appears the scintillation (the interference pattern) clearer than in the case of using the high-pressure mercury lamp. In view of the above, reduction of the scintillation is an essential technology particularly in manufacturing the projector using the laser source.

As such measures for reducing the scintillation, the following technologies have been proposed.

The technology described in JP-A-2006-221069 (Document 1) is for varying the diffusion characteristic with time, and the screen provided with a light diffusion sheet having a polymer-dispersed liquid crystal layer and electrodes for driving the polymer-dispersed liquid crystal layer is described therein. According to this screen, by varying the diffusion characteristic of the light diffusion sheet at high rate it becomes possible to time-overlap the speckle patterns to be homogenized so as not to be conspicuous. Further, JP-A-2005-338520 (Document 2) discloses the image display device using the semiconductor laser diodes as the blue light source and the red light source, and a light emitting diode (LED) for emitting the light (incoherent light) with low coherency as the light source of green to which the human eye has a high luminosity factor.

In other words, as the measures for reducing the scintillation described above, the technology of the Document 1 is for taking measures thereto by making the scintillation inconspicuous on the screen side, and the technology of the Document 2 is for taking measures thereto by reducing the coherency of the light on the light source side, and a certain level of reduction effect can be expected. However, in the technology of the Document 1, since there is a limitation in the response rate of the polymer-dispersed liquid crystal, it is difficult to completely eliminate the scintillation. Further, regarding what takes measures on the screen side, there is a problem that the image becomes blurred with the excessively enhanced diffusivity of the light in the screen, thus making it difficult to obtain a clear image. On the other hand, in the technology of the Document 2, the incoherent light source such as an LED is required to be used, and accordingly the technology is not applicable to the case of configuring all of the light sources with the coherent light sources such as the laser sources, and therefore insufficient as the measure therefor.

It should be noted that the problem described above is prominent in the projectors using the laser source, but is not the problem specific to the projectors using the laser source. The problem is common to the image display devices including, for example, a projector using the lamp such as the high-pressure mercury lamp, and further a direct-view type liquid crystal display besides the projector.

SUMMARY

Rather than the standpoint of solving various problems associated with the scintillation as described above, the invention has an advantage of providing an image display device capable of taking advantage of the scintillation to effectively use it for the display.

In the past field of image display devices, although there have been made many proposals for somehow suppressing or reducing the scintillation caused in displaying images, it has been quite difficult to completely suppress the scintillation. In view of the above, the inventors thought that there might be a measure for rather positively using the scintillation for the display if it was difficult to completely suppress the scintillation. In other words, the inventors thought that since the scintillation was the dazzle caused overlapping the image, in the case in which it was required to promote awareness of the observer using the dazzle or to express a dazzling image, the image with the scintillation could effectively be used, and reached the configuration of the present invention.

According to an aspect of the invention, there is provided an image display device including a lighting section including a light source, a light modulation section that modulates light emitted from the lighting section in accordance with an image signal to form an image, and a scintillation reduction section that reduces the scintillation caused by the light emitted from the lighting section, wherein the scintillation reduction section reduces the scintillation so that a plurality of areas having different extents of reduction of the scintillation from each other is formed in the image. It should be noted that "the image" mentioned in the invention denotes a concept not only including image information represented by a photograph or a painting, but also including textual information.

According to the configuration of the present aspect of the invention, since the a plurality of areas with different extents of reduction of the scintillation is formed in the image in accordance with the content of the image in each of the areas, in the area of one image for displaying textual information expected to invite viewer's attention, for example, display with a small extent of reduction of the scintillation (with the scintillation intensely generated) is performed, and in the area thereof for displaying an image desired to be viewed by the viewer with a preferable image quality, display with a large extent of reduction of the scintillation (with the scintillation sufficiently suppressed) is performed. According to such an operation, there is no need for suppressing or reducing the scintillation evenly throughout the entire screen, and by appropriately using the scintillation reduction technologies in accordance with the situation, it is possible to obtain an image attracting a lot of attention of the viewer or a richly expressive image.

Further, in this aspect of the invention, it is possible that a first area and a second area having different extents of reduction of the scintillation from each other are provided in the image, and the extent of reduction of the scintillation in the first area is larger than the extent of reduction of the scintillation in the second area.

According to this configuration, it is enough to provide at least two areas with different extents of reduction of the scintillation from each other in the image, and by, for example, providing a large difference in the extent of reduction of the scintillation between the first and second areas, the visual effect caused by generating the scintillation can be exerted at a maximum.

Further, in order for realizing the configuration described above, it is possible to adopt the configuration in which the scintillation reduction section includes a light scattering member that scatters the light emitted from the lighting section, the light scattering member is disposed at a position corresponding to the first area, while the light scattering member is absent from a position corresponding to the second area.

According to this configuration, the visual effect described above can easily be obtained only by appropriately designing the shape and the arrangement of the light scattering member.

An image display device according to another aspect of the invention includes a lighting section including a light source, a light modulation section that modulates light emitted from the lighting section in accordance with an image signal to form an image, and a scintillation reduction section that reduces the scintillation caused by the light emitted from the lighting section, and the scintillation reduction section reduces the scintillation so that an extent of reduction of the scintillation is varied in accordance with each of the images switched temporally.

According to the configuration of the present aspect of the invention, since the a plurality of images with different extents of reduction of the scintillation in accordance with the content of the image in each of the periods of the images is switched every period, in the period for displaying textual information expected to invite viewer's attention, for example, out of the series of images switched temporally, display with a small extent of reduction of the scintillation (with the scintillation intensely generated) is performed, and in the period for displaying an image desired to be viewed by the viewer with a preferable image quality, display with a large extent of reduction of the scintillation (with the scintillation sufficiently suppressed) is performed. According to such an operation, there is no need for always suppressing or reducing the scintillation evenly, and by appropriately using the scintillation reduction technologies in accordance with the situation, it is possible to obtain an image attracting a lot of attention of the viewer or a richly expressive image. It should be noted that in order for making the extents of reduction of the scintillation different from each other in accordance with the content of the image in every period, it is preferable to control the scintillation reduction section based on the image signal.

Further, in this aspect of the invention, it is possible to adopt the configuration in which the images switched temporally include an image displayed in a first period and an image displayed in a second period, the extents of reduction of the scintillation in the first and second periods being different from each other, and the extent of reduction of the scintillation in the image displayed in the first period is larger than the extent of reduction of the scintillation in the image displayed in the second period.

According to this configuration, it is enough to provide at least two periods with different extents of reduction of the scintillation, and in terms of the example described above, the period for displaying the image desired to be viewed by the viewer with a preferable image quality corresponds to "the first period," and the period for displaying the textual information or the like expected to invite viewer's attention corresponds to "the second period." For example, by providing a large difference in the extent of reduction of the scintillation between the first period and the second period, the visual effect caused when generating the scintillation can be exerted at a maximum.

Further, in the case with the configuration described above, the three patterns described below are possible as the specific configurations of the scintillation reduction section.

First one is the configuration in which the scintillation reduction section includes a light scattering member that scatters the light emitted from the lighting section, the light scattering member is configured to be one of movable and rotatable in a light path of the light, in the first period, the light scattering member one of moves and rotates in the light path of the light, and in the second period, the light scattering member stops in the light path of the light.

According to this configuration, in the condition in which the scintillation is caused when the light scattering member is in a halt condition while the scintillation is suppressed when the light scattering member is in the moving condition or the rotating condition, by controlling whether the light scattering member is moved in the light path or stopped, or whether the light scattering member is rotated therein or stopped, the two images with different extents of reduction of the scintillation can respectively be formed.

Another is the configuration in which the scintillation reduction section includes a light scattering member that scatters the light emitted from the lighting section, the light scattering member is configured to be movable between an inside and an outside of a light path of the light, in the first period, the light scattering member is located inside the light path of the light, and in the second period, the light scattering member stops in the light path of the light.

According to this configuration, the two images with different extents of reduction of the scintillation can respectively be formed in accordance with whether the light scattering member is positioned inside the light path of the light or positioned outside the light path thereof. In the case with the present configuration, in the case in which the extent of reduction of the scintillation is small, the light scattering member is positioned outside the light path, and the light is not transmitted through the light scattering member at all, therefore, the image with the scintillation intensely generated can be obtained.

Still another is the configuration in which the scintillation reduction section includes a light scattering member having a first area for scattering the light emitted from the lighting section, and a second area having a smaller extent of scattering of the light compared to the first area, the light scattering member is configured to be one of movable and rotatable in a light path of the light, in the first period, the light is transmitted through the first area of the light scattering member, and in the second period, the light is transmitted through the second area of the light scattering member.

According to this configuration, the two images with different extents of reduction of the scintillation can respectively be formed by controlling whether the light is transmitted through the first area of the light scattering member or transmitted through the second area by moving or rotating the light scattering member inside the light path. In the case with the present configuration, since the light scattering member is not required to be disposed outside the light path, the compact configuration of the entire image display device can be realized.

An image display device according to another aspect of the invention includes a lighting section having a first light source that emits first light, and a second light source capable of emitting second light having different coherency from coherency of the first light, a light modulation section that modulates light emitted from the lighting section in accordance with an image signal to form an image, and a control section that controls lighting condition of each of the first and second light sources, and the control section controls the lighting condition of each of the first and second light sources so that an area with a different extent of reduction of the scintillation is formed in the image.

According to the configuration described above, since the first light source and the second light source with different light coherency from each other are provided to the lighting section, by controlling the ON (OFF) conditions of the first light source and the second light source, in the area of one image for displaying textual information expected to invite viewer's attention, for example, display with a small extent of reduction of the scintillation (with the scintillation intensely generated) is performed by increasing the proportion of the light with high coherency, and in the area thereof for displaying an image desired to be viewed by the viewer with a preferable image quality, display with a large extent of reduction of the scintillation (with the scintillation sufficiently suppressed) is performed by increasing the proportion of the light with low coherency. According to such an operation, there is no need for suppressing or reducing the scintillation evenly throughout the entire surface, and by appropriately using the scintillation reduction technologies in accordance with the situation, it is possible to obtain an image attracting a lot of attention of the viewer or a richly expressive image. Further, in the case with the present configuration, since the scintillation reduction section such as the light scattering member can be eliminated, the entire image display device can be made compact.

An image display device according to still another aspect of the invention includes a lighting section having a first light source that emits first light, and a second light source capable of emitting second light having different coherency from coherency of the first light, a light modulation section that modulates light emitted from the lighting section in accordance with an image signal to form an image, and a control section that controls lighting condition of each of the first and second light sources, and the control section controls the lighting condition of each of the first and second light sources so that an extent of reduction of the scintillation is varied in accordance with each of the images switched temporally.

According to the configuration of this aspect of the invention, since the first light source and the second light source with different light coherency from each other are provided to the lighting section, by controlling the lighting conditions of the first light source and the second light source, in the period for displaying textual information expected to invite viewer's attention in the series of images varying temporally, for example, display with a small extent of reduction of the scintillation (with the scintillation intensely generated) is performed by increasing the proportion of the light with high coherency, and in the period for displaying an image desired to be viewed by the viewer with a preferable image quality, display with a large extent of reduction of the scintillation (with the scintillation sufficiently suppressed) is performed by increasing the proportion of the light with low coherency. According to such an operation, there is no need for always suppressing or reducing the scintillation evenly, and by appropriately using the scintillation reduction technologies in accordance with the situation, it is possible to obtain an image attracting a lot of attention of the viewer or a richly expressive image. Further, in the case with the present configuration, since the scintillation reduction section such as the light scattering member described above can be eliminated, the entire image display device can be made compact.

Further, the laser can be used as the first light source, and the light emitting diode can be used as the second light source.

According to this configuration, by using the laser and the light emitting diode as the first and second light sources, respectively, the high-speed response required for the image display device of this aspect of the invention can be satisfied. Further, downsizing and low-profiling of the image display device can be achieved.

In the image display device of the above aspect of the invention, it is assumed that there is provided the light modulation section that modulates the light from the lighting section in accordance with the image signal to form the image. In contrast, this aspect of the invention can be applied to the image display device provided with the image display section that displays the image without modulating the light instead of the light modulation section. For example, in contrast to the fact that an example of the light nodulation section is the liquid crystal light valve, a photograph, a poster, a painting, an advertising display, and so on can be cited as an example of the image forming section. These image display sections are easily viewed as an image by irradiated with the light from the lighting section. The four types of configurations corresponding to these image display devices will be described below.

An image display device according to another aspect of the invention includes an image display section that displays an image, a lighting section including a light source that emits light for lighting the image display section, and a scintillation reduction section that reduces the scintillation caused by the light emitted from the lighting section, and the scintillation reduction section reduces the scintillation so that a plurality of areas having different extents of reduction of the scintillation from each other is formed in the image.

An image display device according to another aspect of the invention includes an image display section that displays an image, a lighting section including a light source that emits light for lighting the image display section, and a scintillation reduction section that reduces the scintillation caused by the light emitted from the lighting section, and the scintillation reduction section reduces the scintillation so that an extent of reduction of the scintillation is varied in accordance with each of the images switched temporally.

An image display device according to still another aspect of the invention includes an image display section that displays an image, a lighting section having a first light source that emits first light for lighting the image display section, and a second light source capable of emitting second light having different coherency from coherency of the first light and for lighting the image display section, and a control section that controls lighting condition of each of the first and second light sources, and the control section controls the lighting condition of each of the first and second light sources so that an area with a different extent of reduction of the scintillation is formed in the image.

An image display device according to still another aspect of the invention includes an image display section that displays an image, a lighting section having a first light source that emits first light for lighting the image display section, and a second light source capable of emitting second light having different coherency from coherency of the first light and for lighting the image display section, and a control section that controls lighting condition of each of the first and second light sources, and the control section controls the lighting condition of each of the first and second light sources so that an extent of reduction of the scintillation is varied in accordance with each of the images switched temporally.

As described above, also in the four types of image display devices of the above aspects of the invention, the same advantage as of the image display device of the above aspects of the invention provided with the light modulation section, and it is possible to obtain an image attracting a lot of attention of the viewer or a richly expressive image.

BRIEF DESCRIPTION OF THE DRAWINGS

The invention will now be described with reference to the accompanying drawings, wherein like numbers reference like elements.

DESCRIPTION OF EXEMPLARY EMBODIMENTS

First Embodiment

Hereinafter, a first embodiment of the invention will be explained with reference to FIGS. 1 through 3.

The image display device of the present embodiment is an example of a liquid crystal projector (projection liquid crystal display device) using a laser source.

Figure 1:
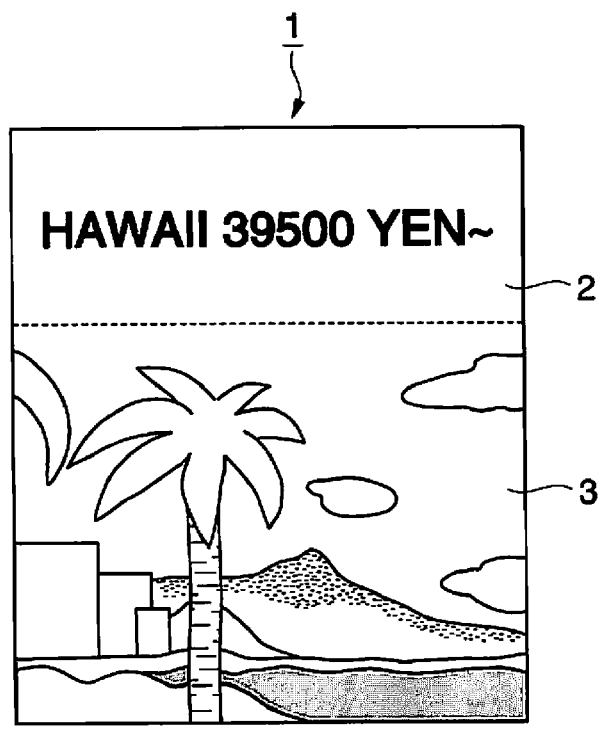
FIG. 1 is a diagram showing an image example by an image display device of a first embodiment of the invention.

FIG. 1 is a diagram showing an example of an image displayed by the image display device of the present embodiment. FIG. 2 is a schematic configuration diagram of the image display device. FIG. 3 is a front elevation view of a scattering plate used for the image display device.

It should be noted that in each of the drawings described below, the ratio, the scale size, and so on of each of the constituents are appropriately made different from each other in order for making the drawings eye-friendly.

As shown in FIG. 1, the image display device of the present embodiment is preferably used for a so-called electronic advertising display system, which is a system having a windowpane of a store as a screen, for example, and for projecting the image to be an advertisement on the screen from a projector main body installed inside the store. In the image show in FIG. 1, the upper port of the image 1 is an area 2 (hereinafter referred to as a textual information display area) for displaying textual information such as an advertising statement, and the lower part of the image 1 is an area 3 (hereinafter referred to as an image information display area) for displaying image information such as a landscape. In the image example, the textual information display area 2 (corresponding to "a second area" in the appended claims) is the area expected to invite viewer's attention, and the image information display area 3 (corresponding to "a first area" in the appended claims) is the area expected to be appreciated by the viewer with a preferable image quality. In the present embodiment, it is assumed that the positions of the textual information display area 2 expected to invite the viewer's attention and the image information display area 3 required to provide the preferable image quality are fixed although the image (the advertisement in this case) can arbitrarily be switched in accordance with the image source provided to the projector main body.

Figure 2:
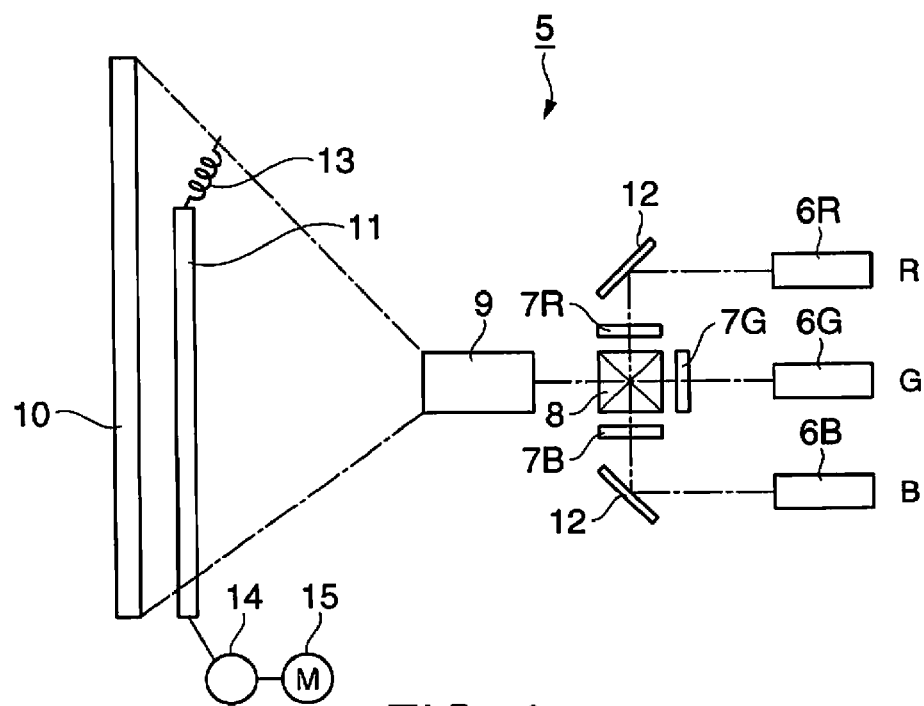
FIG. 2 is a schematic configuration diagram of the image display device.
Figure 3:
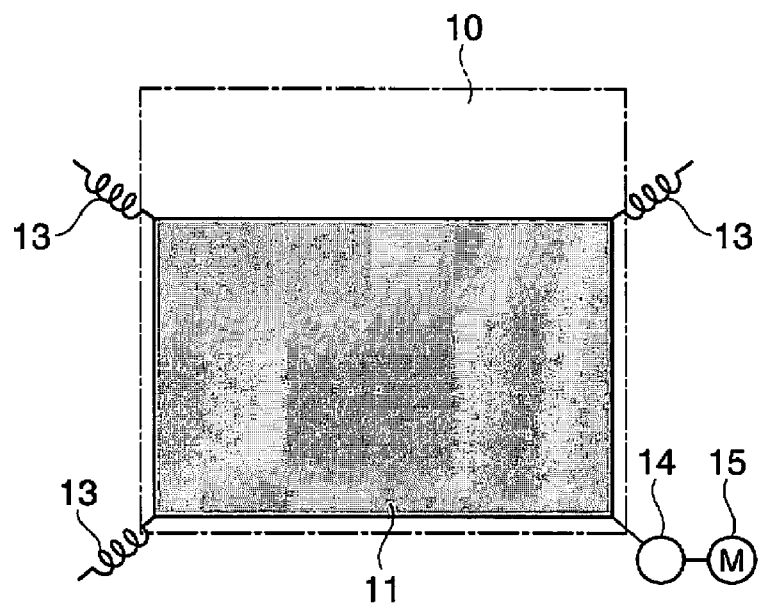
FIG. 3 is a front elevation view of a scattering plate used for the image display device.

As shown in FIG. 2, the image display device 5 of the present embodiment is provided with three laser sources 6R, 6G, 6B (lighting sections), three liquid crystal light valves 7R, 7G, 7B (light modulation sections), a dichroic prism 8, a projection lens 9, a screen 10, and a scattering plate 11 (a scintillation reduction section, a light scattering member). The image display device 5 is provided with a red laser source 6R for emitting a red (R) laser beam, a green laser source 6G for emitting a green (G) laser beam, and a blue laser source 6B for emitting a blue (B) laser beam. The image display device 5 is provided with a red light liquid crystal light valve 7R for modulating the red light, a green light liquid crystal light valve 7G for modulating the green light, a blue light liquid crystal light valve 7B for modulating the blue light corresponding respectively to the laser sources 6R, 6G, 6B. Regarding the red light and the blue light, a mirror 12 is disposed between each of the laser sources 6R, 6B and the respective liquid crystal light valves 7R, 7B, thus the light path of the light emitted from each of the laser sources 6R, 6B is folded as much as 90° by the mirror 12, and the light from the laser sources 6R, 6B enters the respective liquid crystal light valves 7R, 7B. Regarding the green light, the light emitted from the laser source 6G directly proceeds, and enters the liquid crystal light valve 7G.

Each of the liquid crystal light valves 7R, 7G, 7B modulates the light input from the respective one of the laser sources 6R, 6G, 6B. The light beams modulated respectively by the liquid crystal light valves 7R, 7G, 7B are combined by the dichroic prism 8, and the composite light is enlargedly projected on the screen 10 by the projection lens 9.

Between the projection lens 9 and the screen 10, there is disposed the scattering plate 11 for scattering the light emitted from the projection lens 9. The scattering plate 11 has a number of scattering materials dispersed inside the substrate thereof. Alternatively, the scattering plate 11 can also be formed of a plate member having a microscopic relief pattern for scattering the light formed on the surface thereof instead of one having the scattering materials dispersed therein. As shown in FIG. 3, the horizontal (lateral) dimension of the scattering plate 11 is substantially the same as the horizontal dimension of the screen 10, the vertical (perpendicular) dimension of the scattering plate 11 is smaller than the vertical dimension of the screen 10, and the scattering plate 11 and the screen 10 are arranged so that the lower edge of the scattering plate 11 and the lower edge of the screen 10 substantially overlap each other. In the screen 10, the part overlapping the scattering plate 11 corresponds to the image information display area 3 shown in FIG. 1, and the part not overlapping the scattering plate 11 corresponds to the textual information display area 2. In other words, the scattering plate 11 does not exist in the textual information display area 2 expected to invite viewer's attention.

Three corners of the scattering plate 11 out of the four corners thereof are each provided with an elastic spring 13 coupled thereto, and the remaining one corner is provided with a motor 15 coupled via a cam mechanism 14. Thus, when the motor 15 is driven, the movement of the motor 15 is transmitted to the scattering plate 11 via the cam mechanism 14, and minute rotational movement is caused in the scattering plate 11. As a result, the interference position of the incident light to the scattering plate 11 from the projection lens 9 is moved so as to draw a circular orbit with a microscopic diameter (e.g., a diameter of about 300 μm) at a high speed (e.g., a frequency of about 60 Hz). In the case with the present embodiment, it is possible to keep rotating the scattering plate 11 while displaying the image, or to arbitrarily rotate and stop the scattering plate 11.

In the image display device 5 of the present embodiment, since the scattering plate 11 is disposed on the lower area of the screen 10, the speckle pattern (striped or spotted pattern of the luminance unevenness) is moved in a small distance at a high speed by the rotational movement of the scattering plate 11. On this occasion, since the speckle pattern is averaged by the integral operation of the human eyes, the scintillation can effectively be suppressed or reduced. On the other hand, since the scattering plate 11 is not disposed on the upper area of the screen 10, the scintillation is not suppressed there, and a dazzling image is viewed on the screen 10. It should be noted that in the present embodiment, it is assumed that there is the condition in which the scintillation is caused in the area where the scattering plate 11 is eliminated and only the screen 10 exists because of the balance between the projection condition of the optical system of the projector main body and the scattering characteristic of the screen 10. Since the upper area of the screen 10 where the image dazzles corresponds to the textual information display area 2, and the lower area of the screen 10 where the scintillation is sufficiently suppressed corresponds to the image information display area 3, it is possible to realize the image display, which cannot be achieved by the related art, such that the textual information such as the advertising statement is viewed in a dazzling manner to invite viewer's attention, while the image information such as a landscape is viewed with a natural image quality to be eye-friendly to the viewer as shown in FIG. 1.

Second Embodiment

Hereinafter, a second embodiment of the invention will be explained with reference to FIGS. 4 and 5.

The fundamental configuration of the image display device of the present embodiment is the same as that of the first embodiment, and the only difference is the configuration of the scattering plate and the display image example.

Figure 4:
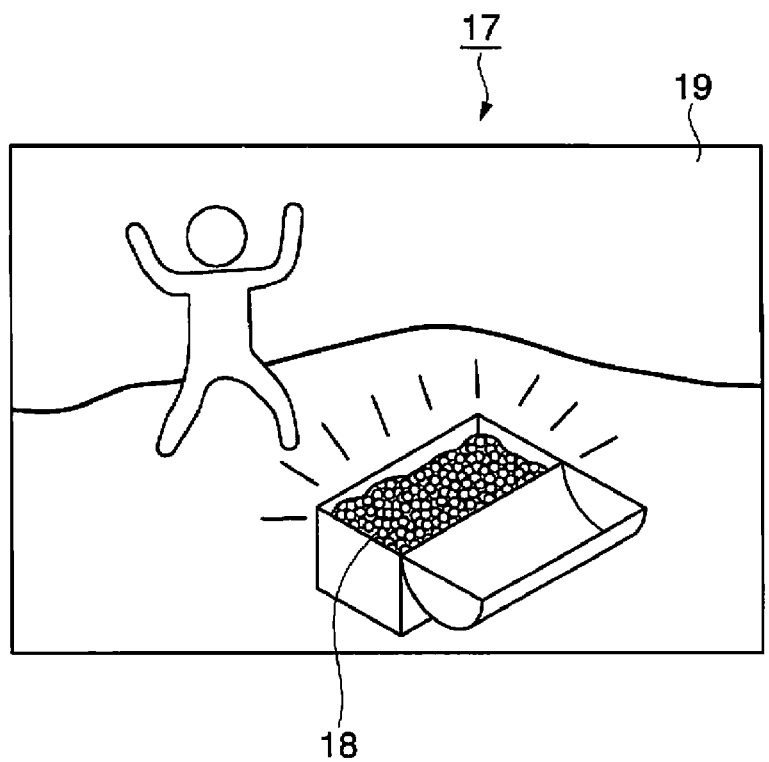
FIG. 4 is a diagram showing an image example by an image display device of a second embodiment of the invention.

FIG. 4 is a diagram showing an example of an image displayed by the image display device of the present embodiment. FIG. 5 is a front elevation view of a scattering plate provided to the image display device. In FIGS. 4 and 5, the common constituents to FIGS. 2 and 3 used in the first embodiment are denoted with the same reference numerals, and detailed explanations therefor will be omitted.

The image display device of the present embodiment is preferable in the case in which there is a requirement that an image includes an object to be viewed with dazzled feeling such as gold bullion or jewels, and the other parts are expected to be viewed as a natural image without dazzling. In the image example shown in FIG. 4, the image 17 includes an area 18 ("the second area," hereinafter referred to as a scintillation display area) for displaying the dazzling image information, and the other peripheral part is an area 19 ("the first area," hereinafter referred to as a scintillation non-display area) for displaying the image information without dazzling. Also in the case with the present embodiment similarly to the first embodiment, it is assumed that the positions of the scintillation display area 18 and the scintillation non-display area 19 are fixed although the image can arbitrarily be switched in accordance with the image source to be supplied to the projector main body.

Figure 5:
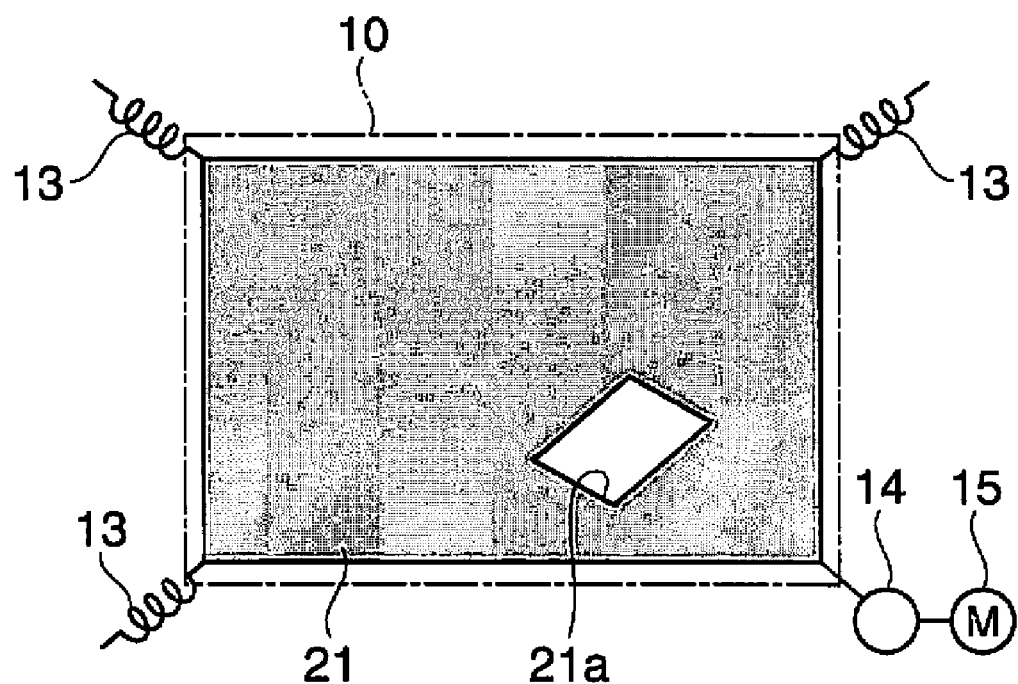
FIG. 5 is a front elevation view of a scattering plate used for the image display device.

As shown in FIG. 5, the scattering plate 21 (the scintillation reduction section, the light scattering member) has the horizontal dimension and the vertical dimension substantially identical respectively to the horizontal dimension and the vertical dimension of the screen 10, and is provided with an opening section 21a disposed at the position corresponding to the scintillation display area 18 shown in FIG. 4. In other words, the scattering plate 21 does not exist in the scintillation display area 18. Similarly to the first embodiment, the three corners of the scattering plate 21 is provided with the springs 13 coupled thereto, the remaining corner is provided with the motor 15 coupled thereto via the cam mechanism 14, and the scattering plate 21 is driven by the motor 15 to perform the rotational movement.

Also in the image display device of the present embodiment, the same advantage as in the first embodiment can be obtained, and the richly expressive image display, which cannot have been achieved by the related art, can be realized.

Third Embodiment

Hereinafter, a third embodiment of the invention will be explained with reference to FIGS. 6A, 6B, and 7.

In contrast to the fact that the image display devices of the first and second embodiments have a configuration of forming the area for generating the scintillation and the area without generating the scintillation in one image, the image display device of the present embodiment has a configuration of automatically switching the period of generating the scintillation and the period of not generating the scintillation in terms of time in a series of time varying images.

Figure 6A:
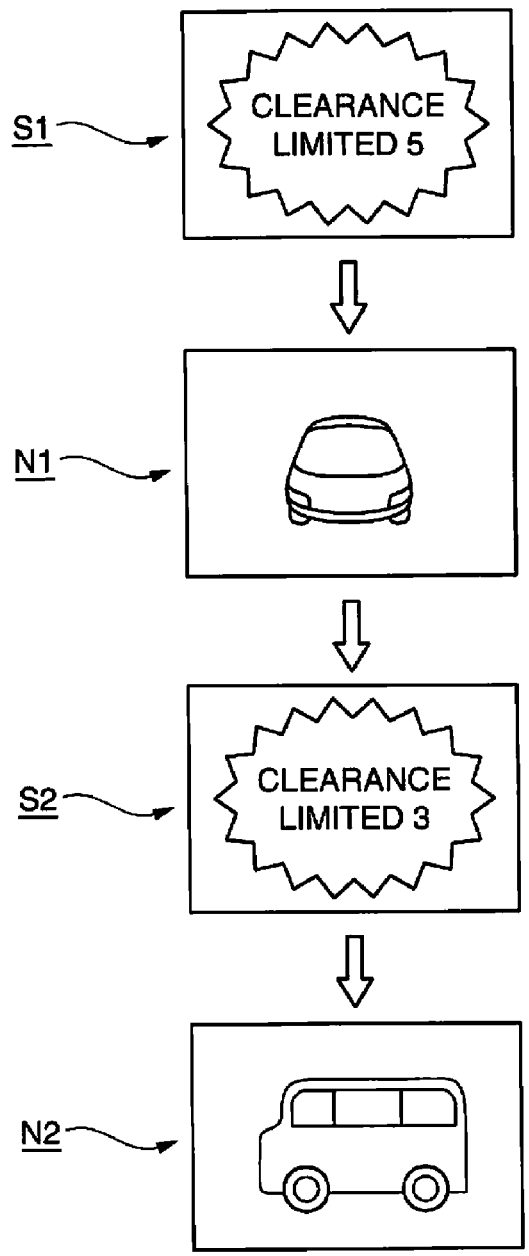
FIGS. 6A and 6B are diagrams showing image examples by an image display device of a third embodiment of the invention.
Figure 6B:
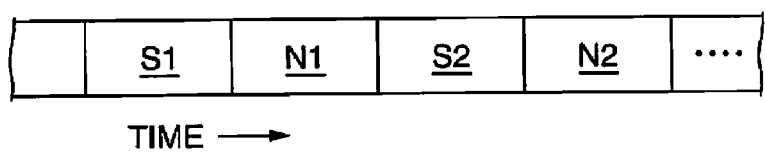

FIGS. 6A and 6B are diagrams showing an example of an image displayed by the image display device of the present embodiment. FIG. 7 is a schematic configuration diagram of the image display device. In FIG. 7, the common constituents to FIG. 2 used in the first embodiment are denoted with the same reference numerals, and detailed explanations therefor will be omitted.

The image display device of the present embodiment is preferably used for, for example, the electronic advertising display system, and as shown in FIGS. 6A and 6B, performs the display while switching a plurality of images by a predetermined period of time such that the first textual information such as an advertising statement is displayed in a period S1 (hereinafter referred to as a first textual information display period), then the first image information such as the object of the advertisement is displayed in a period N1 (hereinafter referred to as a first image information display period), then the second textual information such as an advertising statement is displayed in a period S2 (hereinafter referred to as a second textual information display period), then the second image information such as an object of the advertisement is displayed in a period N2 (hereinafter referred to as a second image information display period), and so on. On this occasion, the textual information display periods S1, S2 (corresponding to "a second period" in the appended claims) are the periods for performing the display expected to invite viewer's attention, and the image information display periods N1, N2 (corresponding to "a first period" in the appended claims) are the periods for performing the display desired to be viewed with a natural image quality. Therefore, in the present embodiment, the information expected to invite viewer's attention and the information desired to be viewed with a natural image quality are alternately displayed.

In the first and second embodiments, it is explained that the scattering plate is always rotated. In contrast, the image display device of the present embodiment has a configuration of controlling the drive condition of the scattering plate based on the content of the image signal. The configuration will hereinafter be explained.

Figure 7:
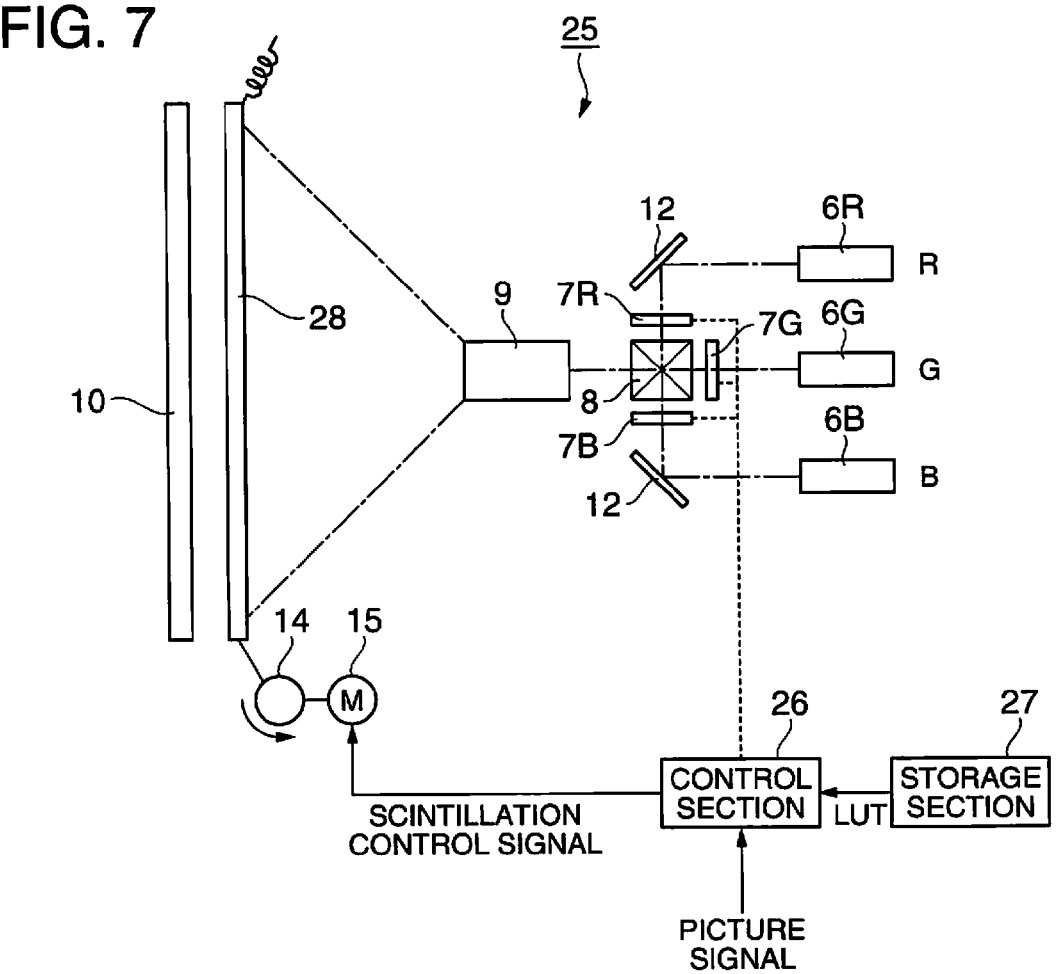
FIG. 7 is a schematic configuration diagram of the image display device.

As shown in FIG. 7, the image display device 25 of the present embodiment is provided with a control section 26 and a storage section 27. Between the projection lens 9 and the screen 10, there is disposed a scattering plate 28 (a scintillation reduction section, a light scattering member) having a size covering the entire surface of the screen 10. The scattering plate 28 has a light scattering characteristic substantially uniform throughout the entire surface thereof, and is not provided with the opening section 21a as provided to the scattering plate 21 of the second embodiment.

In the case with the present embodiment, the storage section 27 previously stores the look-up table (LUT) having correspondence between the first and second textual information and the scintillation control signal for generating the scintillation, and correspondence between the first and second image information and the scintillation control signal for inhibiting generation of the scintillation. The control section 26 retrieves the LUT from the storage section 27 upon input of the picture signal, judges whether or not the scintillation is generated on the image based on the content (e.g., whether it is the textual information or the image information) of the picture signal at that moment, and outputs the judgment result to the motor 15 as the scintillation control signal. When the scintillation control signal indicates "generating the scintillation," the motor 15 is not driven to cause the scattering plate 28 to be in a halt condition, thus the scintillation is generated. On the other hand, when the scintillation control signal indicates "inhibiting generation of the scintillation," the motor 15 is driven to cause the scattering plate 28 to be in a rotating condition, thus the scintillation is suppressed.

According to the image display device 25 of the present embodiment, since the textual information with the scintillation generated and the image information with the scintillation suppressed are temporally switched in accordance with the content of the image in every period, it is not required to keep uniformly suppressing the scintillation, thus the image inviting viewer's attention or the richly expressive image can be obtained.

It should be noted that although the case in which the different still images are switched intermittently is assumed in the present embodiment, the configuration of the present embodiment can be applied to the moving image changing smoothly in terms of time only by setting to the LUT what content of the input picture signal causes the generation of the scintillation and what content thereof causes the generation of the scintillation to be inhibited. Since in the configurations of the first and second embodiment, the scintillation generation area and the scintillation non-generation area are fixed, application thereof to the temporally changing moving images is difficult. In contrast, since in the configuration of the present embodiment the period of generating the scintillation and the period of inhibiting the generation of the scintillation are controlled in accordance with the picture signal, it can be applied enough to the moving images.

Further, although in the present embodiment generation and inhibition of the scintillation is controlled based on the picture signal, it is not necessarily controlled based on the picture signal. For example, generation and inhibition of the scintillation can also be controlled based on time zone information (e.g., the scintillation is generated in the commuting time zone with crowded streets to invite viewer's attention). Alternately, it is possible to display the image expected to invite viewer's attention based on the elapsed time information while generating the scintillation based on the same elapsed time information, thereby realizing the image for inviting viewer's attention. Still further, it is also possible that the surrounding circumstances are detected (e.g., detecting how crowded the street is by a camera or by the sound using a microphone), and the generation and inhibition of the scintillation are controlled based on the detection result.

It should be noted that although in the first through third embodiments, the configuration of suspending the corners of the scattering plates 5, 21, 28 with the springs, and rotating the scattering plates 5, 21, 28 using the motor 15 is adopted, this configuration is not a limitation, and a configuration of moving (vibrating) the scattering plates 5, 21, 28 in a predetermined direction using a drive section such as a piezoelectric element can also be adopted.

Fourth Embodiment

Hereinafter, a fourth embodiment of the invention will be explained with reference to FIG. 8.

Similarly to the third embodiment, the image display device of the present embodiment has a configuration of temporally switching the period of generating the scintillation and the period of inhibiting the generation of the scintillation in a series of images changing temporally. Although the basic configuration of the image display device of the present embodiment is substantially the same as that of the third embodiment, the difference therebetween is that the scattering plate is provided to the light path of each of the laser sources instead of the scattering plate of the third embodiment disposed in the anterior stage of the screen.

Figure 8:
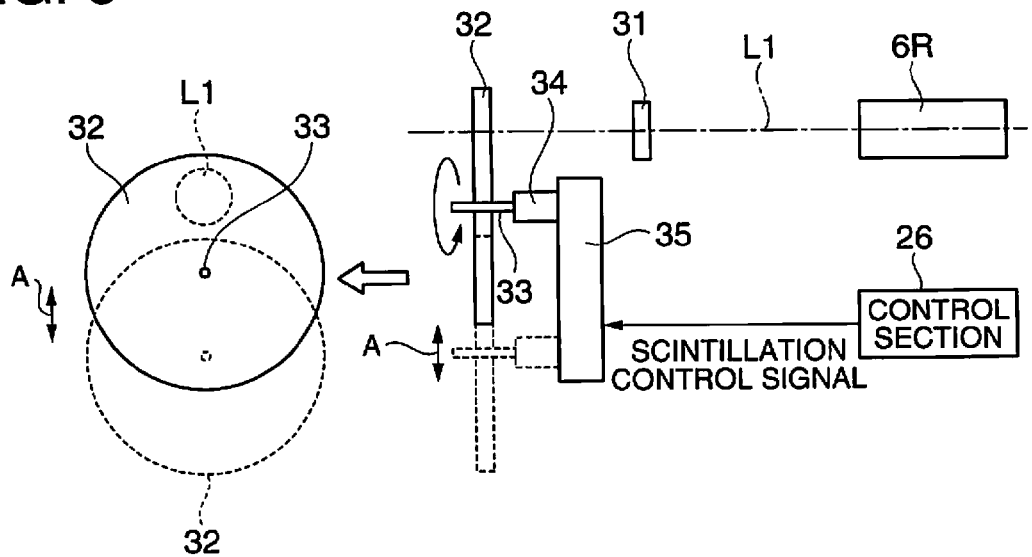
FIG. 8 is a schematic configuration diagram of a substantial part of an image display device of a fourth embodiment of the invention.

FIG. 8 is a diagram showing the configuration of the image display device of the present embodiment. This drawing shows only the part corresponding to one laser source extracted from the overall configuration of the image display device similar to FIG. 7.

Although FIG. 8 is a diagram showing only one laser source 6R (e.g., the red laser source) out of the three laser sources of the image display device of the present embodiment, the other laser sources (the green laser source 6G, the blue laser source 6B) have the same configurations. On the light path of the light emitted from the red laser source 6R, there is disposed a computer generated hologram element 31 (CGH) for homogenizing the illuminance of the light and forming the light to have the shape and size of the liquid crystal light valve in the posterior stage. Further, in the posterior stage of the CGH 31, there is disposed a scattering plate 32 (a scintillation reduction section, a light scattering member). The scattering plate 32 has a substantially even light scattering characteristic throughout the entire surface, and is made rotatable around the rotational axis 33 by a motor 34. Further, the scattering plate 32 is disposed so as to have the surface of the substrate substantially perpendicular to the light path L1 of the light from the laser source 6R, and as shown in FIG. 8 with an arrow A, is made capable of moving between the positions inside and outside the light path L1 of the light from the laser source 6R by an arbitrary moving mechanism 35.

In the case in which the images shown in FIG. 6A are displayed using the image display device of the present embodiment, the control section 26 retrieves the LUT from the storage section, then judges whether the image with scintillation generated is selected or the image without generating the scintillation is selected based on the content (whether it is the textual information or the image information) of the picture signal at that moment, and then outputs the judgment result to the moving mechanism 35 of the scattering plate 32 as the scintillation control signal. When the scintillation control signal indicates "generating the scintillation," the scattering plate 32 is moved to the outside of the light path L1, thus the scintillation is generated. On the other hand, the scintillation control signal indicates "inhibiting generation of the scintillation," the scattering plate 32 is moved to the inside of the light path L1 while rotating, thus the scintillation is suppressed.

According to the configuration of the present embodiment, the same advantage as in the third embodiment that the textual information with the scintillation generated and the image information with the scintillation suppressed are temporally switched in accordance with the content of the image in every period, thus the image inviting viewer's attention or the richly expressive image can be obtained. Since in the case with the present embodiment, the scattering plate 32 is located outside the light path in the period of generating the scintillation, and the light does not at all pass through the scattering plate 32, the image with the scintillation intensely generated can intentionally be obtained.

Fifth Embodiment

Hereinafter, a fifth embodiment of the invention will be explained with reference to FIG. 9.

Similarly to the third and fourth embodiments, the image display device of the present embodiment has a configuration of temporally switching the period of generating the scintillation and the period of inhibiting the generation of the scintillation in a series of images changing temporally. The configuration of the image display device of the present embodiment is substantially the same as that of the fourth embodiment, and the only difference is the configuration of the scattering plate.

Figure 9:
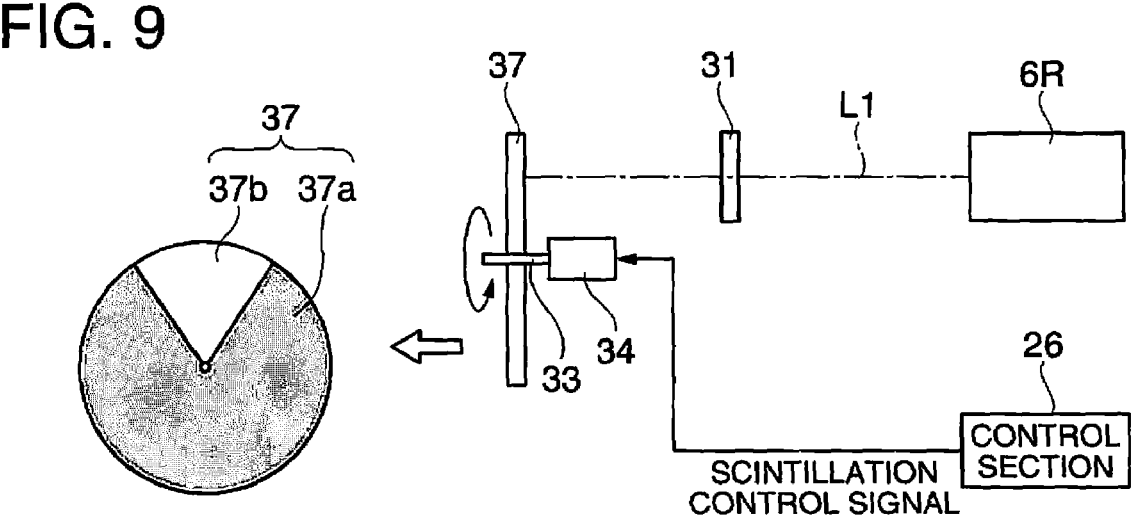
FIG. 9 is a schematic configuration diagram of a substantial part of an image display device of a fifth embodiment of the invention.

FIG. 9 shows only one laser source and the scattering plate extracted from the image display device of the present embodiment, and the same applies to the other laser sources.

In the image display device of the present embodiment, as shown in FIG. 9, the scattering plate 37 (the scintillation reduction section, the light scattering member) is disposed in the posterior stage of the laser source 6R and the CGH 31. The scattering plate 37 has a scattering area 37a (corresponding to "a first area" in the appended claims) having scattering materials dispersed in the transparent substrate, and a non-scattering area 37b (corresponding to "a second area" in the appended claims) where the scattering material does not exist and only the transparent substrate exists. The scattering plate 37 is disposed so that the surface of the substrate is perpendicular to the light path L1 of the light from the laser source 6R, and is made rotatable around the rotational axis 33 by the motor 34. Thus, when the scattering plate 37 is rotated while the light passes through the scattering plate 37, the light is transmitted therethrough while being switched between the scattering area and the non-scattering area in an arbitrary period.

In the case in which the images shown in FIG. 6A are displayed using the image display device of the present embodiment, the control section 26 retrieves the LUT from the storage section, then judges whether the image with scintillation generated is selected or the image without generating the scintillation is selected based on the content (whether it is the textual information or the image information) of the picture signal at that moment, and then outputs the judgment result to the motor 34 of the scattering plate 37 as the scintillation control signal. When the scintillation signal indicates "generating the scintillation," the scattering plate 37 rotates within the angular range in which the light is transmitted through the non-scattering area 37b, thus generating the scintillation. On the other hand, when the scintillation signal indicates "inhibiting generation of the scintillation," the scattering plate 37 rotates within the angular range in which the light is transmitted through the scattering area 37a, thus suppressing the scintillation.

According to the configuration of the present embodiment, the same advantage as in the third and fourth embodiments that the textual information with the scintillation generated and the image information with the scintillation suppressed are temporally switched in accordance with the content of the image in every period, thus the image inviting viewer's attention or the richly expressive image can be obtained. In the case with the present embodiment, since the scattering plate 37 is not required to be moved to the outside of the light path, the moving mechanism for the scattering plate 37 can be eliminated, thus the compact configuration of the entire image display device can be realized.

It should be noted that although the configuration of rotating the scattering plate in order for switching the position where the light is transmitted through between the scattering area and the non-scattering area is adopted in the present embodiment, the configuration is not a limitation, but the configuration of translating the scattering plate, for example, can also be adopted.

Sixth Embodiment

Hereinafter, a sixth embodiment of the invention will be explained with reference to FIG. 10.

Similarly to the third through fifth embodiments, the image display device of the present embodiment has a configuration of temporally switching the period of generating the scintillation and the period of inhibiting the generation of the scintillation in a series of images changing temporally. The difference therebetween is that the image display device of the present embodiment is not equipped with the scattering plate in contrast to the fact that all of the image display devices of the first through fifth embodiments are each equipped with the scattering plate.

Figure 10:
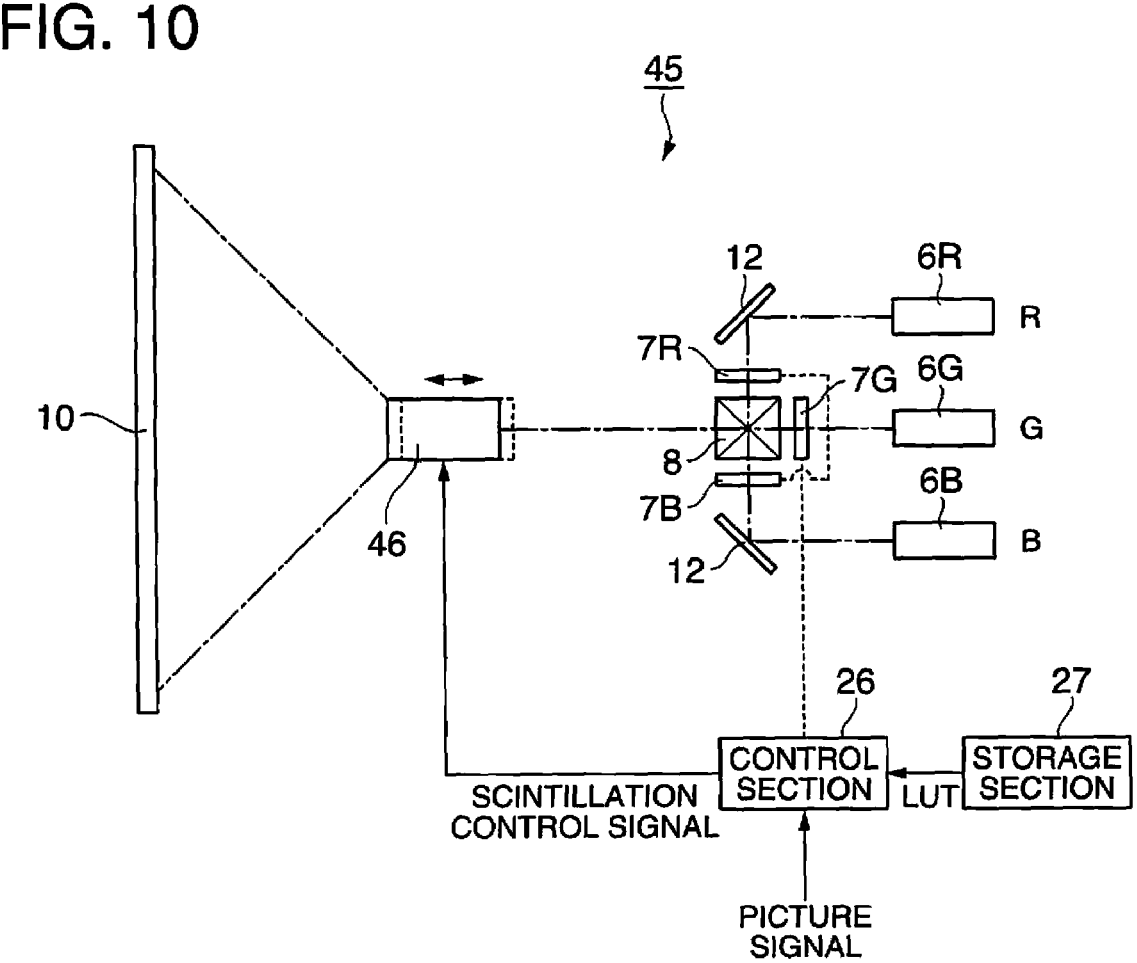
FIG. 10 is a schematic configuration diagram of an image display device of a sixth embodiment of the invention.

FIG. 10 is a schematic configuration diagram of the image display device of the present embodiment. In FIG. 10, the common constituents to FIG. 2 used in the first embodiment are denoted with the same reference numerals, and detailed explanations therefor will be omitted.

As shown in FIG. 10, in the image display device 45 of the present embodiment, the projection lens 46 is provided with a certain vibrating mechanism (not shown), and the projection lens 46 is arranged to be movable along the direction parallel to the optical axis thereof by the vibrating mechanism.

In the case in which the images shown in FIG. 6A are displayed using the image display device 45 of the present embodiment, the control section 26 retrieves the LUT from the storage section 27, then judges whether the image with scintillation generated is selected or the image without generating the scintillation is selected based on the content (whether it is the textual information or the image information) of the picture signal at that moment, and then outputs the judgment result to the vibrating mechanism of the projection lens 46 as the scintillation control signal. When the scintillation control signal indicates "generating the scintillation," the projection lens 46 keeps the halt condition, thus generating the scintillation. On the other hand, when the scintillation control signal indicates "inhibiting generation of the scintillation," the projection lens 46 vibrates within the extent in which the image blur is not caused, thus suppressing the scintillation.

According to the configuration of the present embodiment, the same advantage as in the third through fifth embodiments that the textual information with the scintillation generated and the image information with the scintillation suppressed are temporally switched in accordance with the content of the image in every period, thus the image inviting viewer's attention or the richly expressive image can be obtained. In the case with the present embodiment, since the scattering plate can be eliminated, space reduction can be achieved, further downsizing of the image display device can be achieved in comparison with the other embodiments.

Seventh Embodiment

Hereinafter, a seventh embodiment of the invention will be explained with reference to FIG. 11.

Similarly to the third through sixth embodiments, the image display device of the present embodiment has a configuration of temporally switching the period of generating the scintillation and the period of inhibiting the generation of the scintillation in a series of images changing temporally. The difference therebetween is that the image display device of the present embodiment is not equipped with the scattering plate in contrast to the fact that all of the image display devices of the first through fifth embodiments are each equipped with the scattering plate.

Figure 11:
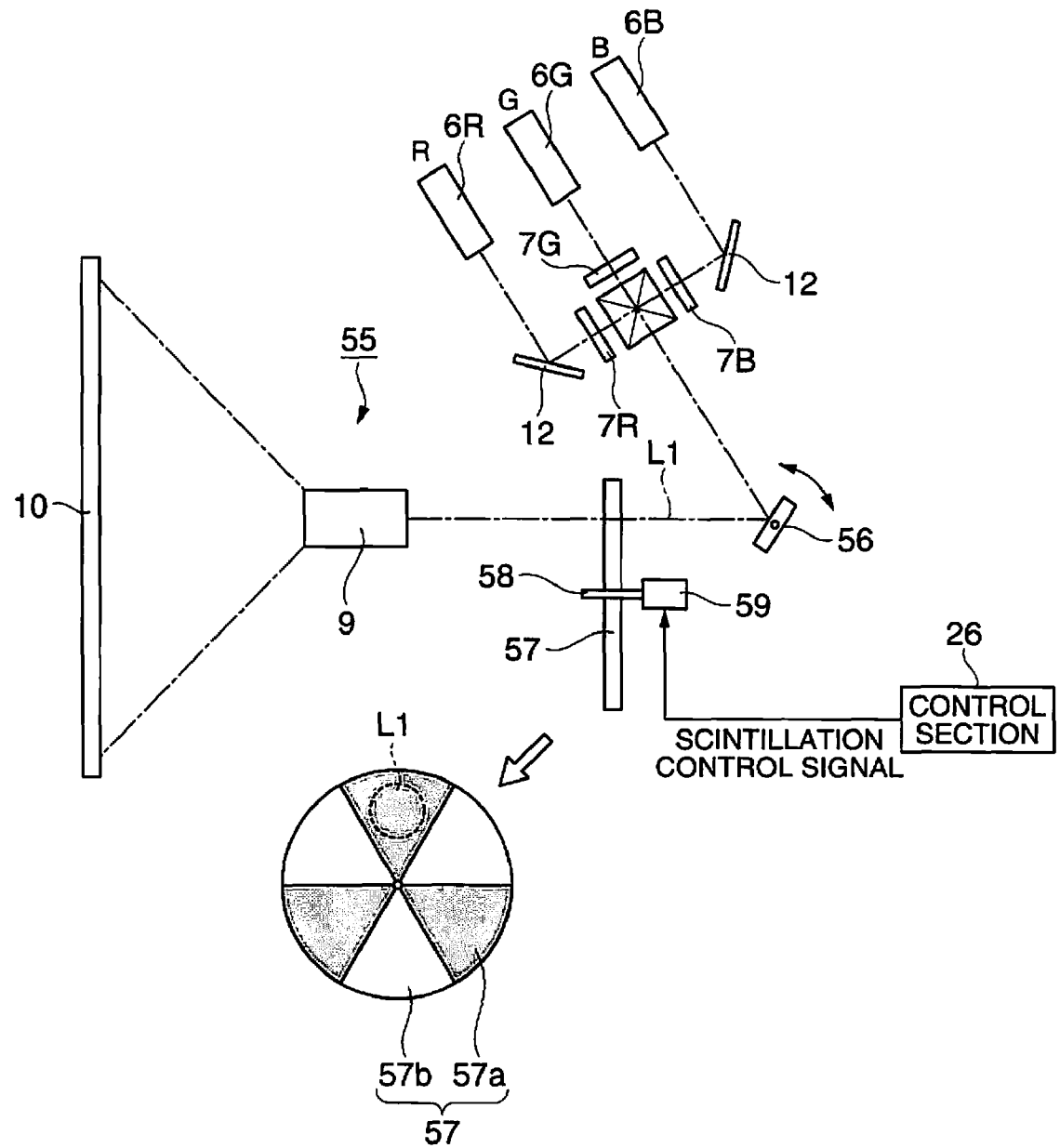
FIG. 11 is a schematic configuration diagram of an image display device of a seventh embodiment of the invention.

FIG. 11 is a schematic configuration diagram of the image display device of the present embodiment. In FIG. 11, the common constituents to FIG. 2 used in the first embodiment are denoted with the same reference numerals, and detailed explanations therefor will be omitted.

As shown in FIG. 11, the image display device 55 of the present embodiment is provided with a scanner 56 for scanning the light on the screen 10, wherein the light is obtained by the dichroic prism 8 combining the light beams emitted from the laser sources 6R, 6G, 6B and then modulated respectively by the three liquid crystal light valves 7R, 7G, 7B. Between the scanner 56 and the projection lens 9, there is disposed a retardation plate 57 (a scintillation reduction section). The retardation plate 57 has the areas 57a for providing the transmitted light with a phase difference of roughly a half of the wavelength, and the areas 57b for providing no phase difference. The retardation plate 57 is disposed so that the surface of the substrate is perpendicular to the light path L1 of the light from the scanner 56, and is made rotatable around the rotational axis 58 by the motor 59.

In the case in which the images shown in FIG. 6A are displayed using the image display device 55 of the present embodiment, the control section 26 retrieves the LUT from the storage section, then judges whether the image with scintillation generated is selected or the image without generating the scintillation is selected based on the content (whether it is the textual information or the image information) of the picture signal at that moment, and then outputs the judgment result to the motor 59 of the retardation plate 57 as the scintillation control signal. When the scintillation control signal indicates "generating the scintillation," the retardation plate 57 becomes in the halt condition not to temporally change the phase difference, thus the scintillation is caused. On the other hand, when the scintillation control signal indicates "inhibiting generation of the scintillation," the retardation plate 57 becomes in the rotating condition to temporally change the phase difference, thus the scintillation is suppressed.

According to the configuration of the present embodiment, the same advantage as in the third through sixth embodiments that the textual information with the scintillation generated and the image information with the scintillation suppressed are temporally switched in accordance with the content of the image in every period, thus the image inviting viewer's attention or the richly expressive image can be obtained.

Eighth Embodiment

Hereinafter, an eighth embodiment of the invention will be explained with reference to FIGS. 12A and 12B.

In contrast to the fact that the image display devices of the embodiments described above use the scattering plate or the retardation plate as the scintillation reduction section, the image display device of the present embodiment is provided with two kinds of light sources different from each other, namely a light source capable of (or easily of) reducing the scintillation, and a light source incapable of (or having difficulty) reducing the scintillation instead of disposing such optical elements inside the light path.

The image display device of the present embodiment is an example of the liquid crystal television.

Figure 12A:
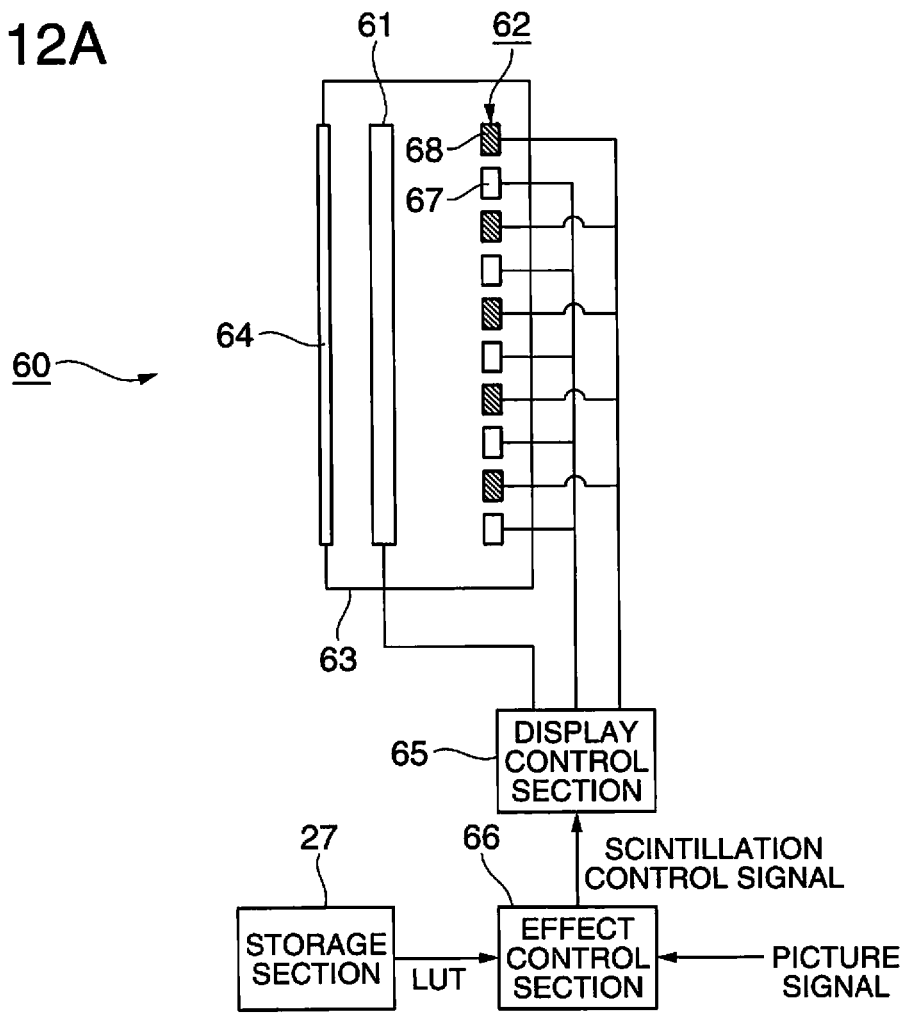
FIGS. 12A and 12B are schematic configuration diagrams of an image display device of an eighth embodiment of the invention.
Figure 12B:
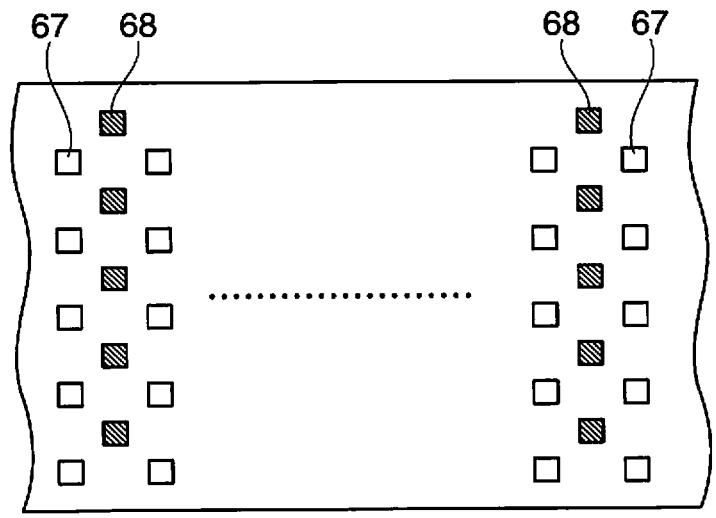

FIG. 12A is a schematic configuration diagram of the image display device in the present embodiment, and FIG. 12B is a front elevation view showing an example of the arrangement of the light sources used for the image display device.

As shown in FIG. 12A, the image display device 60 of the present embodiment is provided with a liquid crystal panel 61 (a light modulation section), a backlight 62 (a lighting section), a housing 63, a screen cover 64, a display control section 65, an effect control section 66, and the storage section 27. The backlight 62 is provided with a plurality of light emitting diodes 67 (first light sources) and a plurality of lasers 68 (second light sources), and as shown in FIG. 12B, these light emitting diodes 67 and the lasers 68 are arranged throughout substantially the entire surface of the screen so that anywhere on the screen can be irradiated with both of the light from the light emitting diode 67 and the light from the laser 68. In the case with the present embodiment, the light sources are arranged in the vertical direction in the screen, and the light sources on the odd columns from the left such as the first column, the third column, and so on from the left are light emitting diodes 67, while the light sources on the even columns from the left such as the second column, the fourth column, and so on from the left are lasers 68. The light emitting diodes 67 and the lasers 68 on the adjacent columns are arranged in a so-called zigzag manner so that the positions thereof in the vertical direction are shifted a half pitch from each other. It should be noted that the arrangement of the light sources is not limited thereto, it is enough to arrange the light sources so that the both of the light beams from the two kinds of light sources can illuminate anywhere on the screen.

The light emitting diode 67 is a light source that emits the light (incoherent light) with low coherency, and the laser 68 is a light source that emits the light (coherent light) with high coherency. The display control section 65 is arranged to be able to individually control emission (ON) and non-emission (OFF) of each of the light emitting diodes 67 and each of the lasers 68. Therefore, by temporally switching the period of putting ON the light emitting diodes 67 of all of the light sources forming the backlight 62 and putting OFF the lasers 68, and the period of putting OFF the light emitting diodes 67 and putting ON the lasers 68, it is possible to temporally switch the period of not generating the scintillation and the period of generating the scintillation from each other. Alternatively, by forming the area of the entire screen in which the light emitting diodes 67 are put ON and the lasers 68 are put OFF, and the area in which the light emitting diodes 67 are put OFF and the lasers 68 are put ON, it is possible to form the area for inhibiting generation of the scintillation and the area for generating the scintillation in one screen.

In the case in which the image is displayed using the image display device 60 of the present embodiment, the effect control section 66 retrieves the LUT from the storage section 27, judges whether the image with the scintillation generated and the image without generating the scintillation are temporally switched, or the scintillation generation area and the scintillation non-generation area are separately formed in one screen based on the content of the picture signal at that moment, and outputs the judgment result to the display control section 65 as the scintillation control signal. The display control section 65 controls the liquid crystal panel 61, and at the same time, controls ON/OFF of each of the light emitting diodes 67 and each of the lasers 68 of the backlight 62. On this occasion, in the case in which the image with the scintillation generated and the image without generating the scintillation are temporally switched as the image examples shown in FIG. 6A, when the scintillation control signal indicates "generating the scintillation," by putting ON the lasers 68 while putting OFF the light emitting diodes 67 throughout the entire surface of the screen, the scintillation is generated. On the other hand, when the scintillation control signal indicates "inhibiting generation of the scintillation," the light emitting diodes 67 are put ON and the lasers 68 are put OFF throughout the entire surface of the screen, thereby suppressing the scintillation.

Further, in the case in which a part of the screen is defined as the scintillation generation area, and the rest of the screen is defined as the scintillation non-generation area as the image examples show in FIGS. 1 and 4, it is sufficient to put ON the lasers 68 located in the scintillation generation area and put OFF the light emitting diodes 67 located there, while putting ON the light emitting diodes 67 located in the scintillation non-generation area and putting OFF the lasers 68 located there.

According to the configuration of the present embodiment, the display with the scintillation generated and the display with the scintillation suppressed can temporally be switched in accordance with the content of the image in every period. Further, display having the information with the scintillation generated and the information with the scintillation suppressed mixed in one screen in accordance with the content of the image can be performed. Still further, the two kinds of display described above can also be switched in accordance with the content of the image, thus the image further superior in expressive capability can be obtained.

Ninth Embodiment

Hereinafter, a ninth embodiment of the invention will be explained with reference to FIG. 13.

The image display device of the embodiment described above is an example using the Digital Micromirror Device™ (DMD™) as the light modulation section instead of the liquid crystal light valve.

Figure 13:
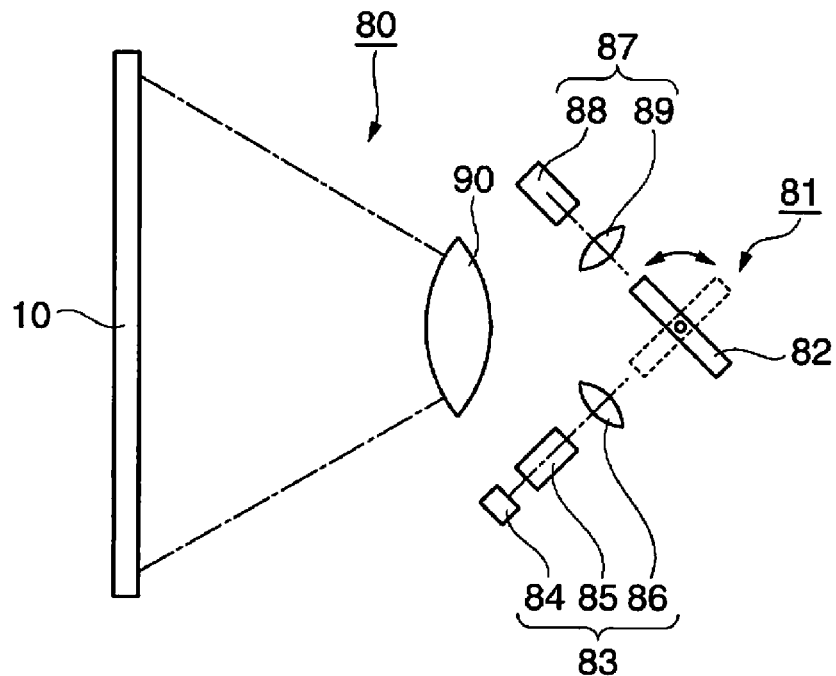
FIG. 13 is a schematic configuration diagram of an image display device of a ninth embodiment of the invention.
Figures 14A, 14B:
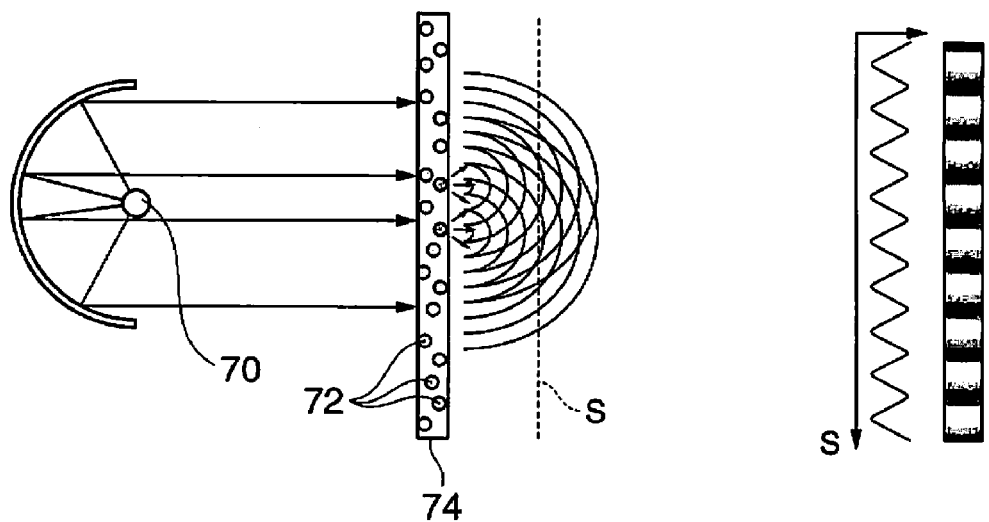
FIGS. 14A and 14B are diagrams for explaining the generation principle of the scintillation.

FIG. 13 is a schematic configuration diagram of the image display device of the present embodiment.

As shown in FIG. 13, the image display device 80 of the present embodiment is provided with the DMD 81, wherein the light emitting diode light source 83 (including a light emitting diode chip 84, a rod lens 85, and a focusing lens 86) is disposed on the ON side of the mirror 82 forming the DMD 81, and the laser source 87 (including a light source main body 88 and a focusing lens 89) is disposed on the OFF side thereof. The reference numeral 90 denotes the projection lens. According to this configuration, generation and inhibition of generation of the scintillation, or the extent of the scintillation reduction can be controlled by the mirror 82 provided for each pixel. In the present embodiment, pulse width modulation (PWM) is used for the brightness modulation of each pixel, in which the ratio between the ON time and the OFF time of each of the light sources 83, 87 is utilized.

According to the configuration of the present embodiment, the same advantage as in the eighth embodiment that the information with the scintillation generated and the information with the scintillation suppressed are locally used or temporally switched in accordance with the content of the image, thus the image inviting viewer's attention or the richly expressive image can be obtained.

It should be noted that the scope of the invention is not limited to the embodiments described above, but various modifications can be executed thereon within the range of the scope or the spirit of the invention. For example, although in the embodiments described above there are shown the example of the zero-one control in which the scintillation is generated or suppressed, it is possible to adopt a configuration of controlling the extent of the generation of the scintillation with several levels or performing analog control. Thus, the image with further enhanced expression power can be obtained.

Further, in the embodiments described above, the examples of the image display devices equipped with the light modulation section such as the projector equipped with the liquid crystal light valve or the liquid crystal television equipped with the liquid crystal panel. In contrast, the invention can also be applied to the image display device equipped with an image display section that mainly displays still images. As an example of such an image display section, a photograph, a poster, a painting, an advertising display, and soon can be cited. These image display sections are viewed as images added with the visual effect by the scintillation by irradiated on the front surface with the light from the lighting section, or by irradiated from the back surface with the light from the lighting section in the case with the image display section having light permeability. In this case, although the configuration of using generation of the scintillation and inhibition of generation of the scintillation by the area in accordance with the conditions is principal, it is also possible to adopt the configuration of temporally switching generation of the scintillation and inhibition of generation of the scintillation by performing illumination while temporally switching, for example, the lasers and the light emitting diodes.

The entire disclosure of Japanese Patent Application No. 2007-204166, filed Aug. 6, 2007 is expressly incorporated by reference herein.

What is claimed is:

1. An image display device comprising:
   a lighting section including a light source;
   a light modulation section that modulates light emitted from the lighting section in accordance with an image signal to form an image; and
   a scintillation reduction section that reduces the scintillation caused by the light emitted from the lighting section,
   wherein the scintillation reduction section reduces the scintillation so that a plurality of areas having different extents of reduction of the scintillation from each other is formed in the image.

2. The image display device according to claim 1,
   wherein a first area and a second area having different extents of reduction of the scintillation from each other are provided in the image, and
   the extent of reduction of the scintillation in the first area is larger than the extent of reduction of the scintillation in the second area.

3. The image display device according to claim 2,
   wherein the scintillation reduction section includes a light scattering member that scatters the light emitted from the lighting section, and
   the light scattering member is disposed at a position corresponding to the first area, while the light scattering member is absent from a position corresponding to the second area.

* * * * *